Patented Jan. 10, 1939

2,143,152

UNITED STATES PATENT OFFICE 2,143,152

MANUFACTURE OF AROMATIC AMINES

Lee Cone Holt, Wilmington, Del., and Lee Linsley Alexander, Woodstown, N. J., assignors to E. I. du Pont de Nemours & Company, Wilmington, Del., a corporation of Delaware No Drawing. Application September 9, 1937, Serial No. 163,032

10 Claims. (Cl. 260—580)

This invention relates to the manufacture of aromatic amines by reduction of the corresponding nitro compounds. More particularly, this invention deals with those processes of manufacture which employ iron and acid for the reduction, and has as its object to facilitate recovery of the resulting amine, where the latter is of low volatility and does not lend itself readily to separation from the iron sludge by means of distillation.

When aromatic nitro bodies are reduced by means of iron there is formed along with the amine a large amount of iron oxide. Whenever possible the amines are separated from the iron oxide by either steam or vacuum distillation. In some cases where the amine has a very low vapor pressure, it has been separated from the iron sludge by extraction with an organic solvent. This latter method has been very unsatisfactory from an operating standpoint, as the separation of the organic solvent from the wet iron sludge has always been difficult. It has also been an expensive method, for without special expensive equipment the solvent losses have been high and the fire risk great. In one particular case, that of thioaniline, it has been proposed to extract the base with large volumes of dilute sulfuric acid. This, however, has not been a practical success because the solubility of the sulfate is very low, particularly in the presence of ferrous sulfate.

It is an object of this invention to supply a simple and economical method for separating amines of low vapor pressure from the iron sludge resulting from the reduction of the corresponding nitro body with iron. Other useful objects will appear as the description proceeds.

We attain these objects of our invention by arranging the separation of the arylamine from the iron sludge according to the special process hereinbelow described, which takes advantage of two natural principles, namely, (1) that the hydrochloride of the average aromatic amine is much more soluble in water than the sulfate, and (2) that the hydrochloride of the average aromatic amine generally exerts a hydrotropic action on the free amine with respect to water; in other words, the quantity of free amine which will dissolve in a given volume of water can be increased by adding some of the hydrochloride of the same amine to the system.

Based on these two principles, our novel process of recovery consists of the following steps: First we treat the mixture of iron, iron oxide and amine resulting from the reduction of a nitro body, with hydrochloric acid insufficient in amount to dissolve all of the iron and iron oxide. Under these conditions only part of the amine is converted into the hydrochloride. When the undissolved iron and iron oxide are filtered off the amine goes into the filtrate partly as the hydrochloride and partly as the free amine dissolved and suspended in the solution of the hydrochloride and ferrous chloride. In the next step we acidify the filtrate by means of sulfuric acid, and add sodium sulfate to precipitate the amine as the neutral sulfate.

The details of our process and the reasons therefore can best be described by referring to the manufacture of thioaniline as a specific illustration. It will be understood, however, that our invention is not limited to this particular compound, but may be applied to the manufacture of any aromatic amine which is prepared by iron-and-acid reduction of the corresponding nitro compound, and which, like thioaniline, is insufficiently volatile to permit of economic recovery by the aid of distillation.

Thioaniline (which is diamino-diphenyl-sulfide) can be readily formed by the reduction of 4-amino-4'-nitro-diphenyl-sulfide by the aid of iron and acetic acid in the presence of a small amount of ferrous acetate. Yet, this simple method of reduction has not been used commercially, because there has been no practical method for isolating the amine produced from the iron sludge. The distillation of thioaniline is impossible because it decomposes readily. It has been proposed to extract the thioaniline from the sludge by the aid of organic solvents, but this process has not been successful economically.

We have now found that if a limited quantity of hydrochloric acid as above specified, is added to the mass when reduction is complete, the thioaniline goes into solution partly as the hydrochloride and partly as the free amine. If the filtration from the undissolved iron sludge is made as hot as possible some of the thioaniline may also come thru the filter suspended in the solution of the hydrochloride and ferrous chloride. We do not use in our process enough hydrochloric to dissolve all of the iron sludge; therefore, the operation can be carried out at so low an acidity that iron equipment can be used. The thioaniline is isolated from the filtrate by first making it acid to Congo paper by means of sulfuric acid and then precipitating the neutral sulfate by addition of sodium sulfate.

Without limiting our invention to any particular procedure, the following examples, in which parts by weight are given, will serve to illustrate our preferred mode of operation.

Example 1

400 parts of water and 89 parts of iron powder were charged into an iron agitated reducer. 2.6 parts of acetic acid were then added in the form of a 30% aqueous solution, and the mass was heated to about 98° C. with the agitator turning. There were then added gradually, during about 2 hours, 134 parts of 4-amino-4'-nitrodiphenyl-sulfide having a melting point of not less than 134° C. The temperature was kept at 98–100° C. during the addition of the nitro body and for seven hours afterwards. There were then added 200 parts of water and 42.5 parts of hydrochloric acid in the form of a 20° Bé. aqueous solution. The temperature was then quickly raised to the boiling point and the mass quickly filtered. The solution coming through the press was slightly turbid with suspended free thioaniline. The residue in the kettle was stirred and boiled with three portions of 100 parts each of water, to the first of which 25 parts of 20° Bé. hydrochloric acid had been added, and the others 5 parts each. These washes were filtered and added to the main filtrate.

The combined filtrates were then heated to 80 to 90° C. and made distinctly acid to Congo paper with sulfuric acid. This required about 25 parts of sulfuric acid. To the hot solution, there were then added 175 parts of anhydrous sodium sulfate for each 1000 parts of solution. This was added in equal portions about every five minutes during an hour and a half. Thioaniline sulfate separated out as an easily filterable crystal suspension. The latter was cooled to room temperature and filtered on a suction filter. The cake was pressed smooth and washed with 15% sodium sulfate solution till the filtrate gave only a light green color with sodium ferrocyanide. There was obtained an excellent yield of thioaniline in the form of its sulfate. This sulfate, when dissolved in aqueous hydrochloric acid solution, diazotized readily to a perfectly clear solution. Repeated runs gave uniformly good results.

Example 2

98 parts of para-nitro-chlorobenzene were reduced with 89 parts of iron, following the procedure given in Example 1. The method of working up was exactly as given in Example 1. There were obtained 125 parts of dry cake which contained 105.5 parts of para-chloro-aniline sulfate. This sulfate was used with satisfactory results for conversion to para-chloro-aniline-ortho-sulfonic acid by baking.

Example 3

257 parts of 2-chloro-4-nitro-toluene were reduced with 210 parts of iron following the procedure of Example 1. The isolation likewise followed the procedure of Example 1. 2-chloro-4-amino-toluene was obtained as the sulfate in good yield.

Example 4

106 parts of 2-chloro-4-nitrophenetol were reduced with 89 parts of iron following the procedure of Example 1 including the recovery procedure. A good yield of 2-chloro-4-aminophenetol was obtained, in the form of the sulfate.

In a similar manner other aromatic amines may be separated from the iron sludge in which they are formed, provided they satisfy the following two elementary tests: (1) They must be sufficiently basic to form a hydrochloride which is stable in aqueous solution. (2) Their hydrochloride must be of sufficient solubility in water to permit of practical extraction from the sludge with a reasonable volume of water. A third condition is that the sulfate must be considerably less soluble than the hydrochloride of the amine, but this condition is generally true of practically all aromatic amines.

The above points may best be illustrated by mentioning some examples which fall outside the prescribed conditions. 2-amino-1,4-dichloro-benzene, being loaded as it is with two negative substituents (the halogen atoms), is too weak a base to form a stable salt with hydrochloric acid. Alpha-naphthyl-amine on the other hand forms a stable hydrochloride, but the latter is too insoluble to permit of its practical extraction from the sludge. Therefore, in both cases, the application of our invention is not satisfactory. Our invention, however, gives highly satisfactory results with a great variety of compounds which fall between the two extremes above indicated.

It will be understood that the details of operation may be varied considerably from those set forth in the above examples, without departing from the spirit of this invention. Thus, instead of using acetic acid in the reduction step, any other acid customarily employed for such reductions, for instances hydrochloric acid or sulfuric acid may be employed. Instead of precipitating the arylamine sulfate in the final step with sodium sulfate, any other water soluble sulfate may be employed; for instance, ammonium sulfate.

The quantity of hydrochloric acid added to the sludge may be varied widely, but should best be kept down to a minimum. Excessive quantities of hydrochloric acid at this point will interfere with the subsequent precipitation of the amine as the neutral sulfate, inasmuch as it will retain some of the amine in the form of the soluble hydrochloride.

The best procedure is to use just sufficient hydrochloric acid to render the entire amine content of the sludge water-soluble or water dispersible, bearing in mind that conversion of only part of the amine into the hydrochloride will achieve this effect by virtue of its hydrotropic action on the free amine. The exact quantity of HCl requisite for this purpose, can best be determined experimentally in each particular case by the aid of a test sample.

The quantity of sulfuric acid employed for acidification of the filtrates, may likewise be varied but should preferably be kept to a minimum. A good rule to follow is to add only sufficient $H_2SO_4$ to impart to the mass a well defined acid reaction toward Congo red paper.

Our novel process has the following advantages over those heretofore proposed or used in the art: We generally recover the desired amine in excellent yield. The purity of the product is very high, and the product may be used directly for diazotization in the manufacture of dyestuffs. Also, the materials employed by us are relatively cheap, and there are no solvent-recovery or solvent-waste problems. In cases where it is desired to convert the resulting amine into a sulfonic acid, our product may be employed directly, and the sulfonation may in some cases be achieved by mere heating. (Cf. Example 2 above.)

In the claims below the expression "iron sludge" is intended as a collective term for the mass of iron and iron oxide which is present in the reduction mass.

We claim:

1. In the process of manufacturing an aromatic amine which is adapted to form a stable, water-soluble hydrochloride, by reducing the corresponding nitro compound with iron and acid, the improvement which comprises extracting the reduction mass with aqueous hydrochloric acid in a quantity insufficient to dissolve all the iron sludge, filtering off the undissolved impurities, and then recovering the amine from the filtrates in the form of a sulfate.

2. The process of recovering an aromatic amine which has been produced from the corresponding nitro body by reduction with iron and acid, and which is insufficiently volatile to permit of economic recovery by distillation but is capable of forming a stable, water-soluble hydrochloride, which comprises extracting the reduction mass with aqueous hydrochloric acid in a quantity insufficient to dissolve all the iron sludge, filtering off the undissolved impurities, and then recovering the amine from the filtrates in the form of a sulfate.

3. In the process of manufacturing an aromatic amine which is adapted to form a stable, water-soluble hydrochloride, by reducing the corresponding nitro compound with iron and acid, the improvement which comprises extracting the reduction mass with aqueous hydrochloric acid in a quantity insufficient to dissolve all the iron sludge, filtering off the undissolved impurities, and then acidifying the filtrate by means of sulfuric acid, and precipitating the aromatic amine in the form of its sulfate by the aid of a water-soluble sulfate.

4. The process of recovering thioaniline from the iron and acid reduction mass in which it has been formed from 4-amino-4'-nitro-diphenylsulfide, which comprises adding to the reduction mass a quantity of aqueous hydrochloric acid insufficient to dissolve all the iron sludge but sufficient to render the entire amine content of the mass readily miscible with water, separating the liquid mass from the undissolved solid impurities, acidifying the liquid mass with sulfuric acid, and then adding a water-soluble sulfate, to precipitate the thioaniline in the form of its sulfate.

5. The process which comprises subjecting to reduction by the aid of iron and acid an aromatic nitro body which is capable of reduction to give an aromatic amine which is sufficiently basic to form a stable salt with hydrochloric acid, and whose hydrochloride thus produced is water-soluble, but whose sulfate is substantially water-insoluble; then adding to the reaction mass a quantity of hydrochloric acid insufficient to dissolve all the iron sludge but sufficient to solubilize hydrotropically the greater portion of its amine content, separating the liquid content of the mass thus obtained from its solid material, adding to the separated liquid portion a quantity of sulfuric acid sufficient to render the mass acid to Congo red paper, then adding a water-soluble sulfate, and recovering the precipitated aromatic ammonium sulfate.

6. The process which comprises subjecting 4-amino-4'-nitro-diphenyl-sulfide to reduction by the aid of iron and acid, then adding to the reaction mass a quantity of hydrochloric acid insufficient to dissolve all the iron and iron-oxide but sufficient to solubilize hydrotropically the greater portion of its amine content, separating the liquid content of the mass thus obtained from its solid material, adding to the separated liquid portion a quantity of sulfuric acid sufficient to render the mass acid to Congo red paper, then adding a water-soluble sulfate, and recovering the precipitated aromatic ammonium sulfate.

7. A process as in claim 5 applied to the manufacture of a chloro-aryl-amine of the benzene series, having no further acidic substituents.

8. The process of separating from solid, water-insoluble impurities an aromatic amine which is not sufficiently volatile to permit of recovery by distillation but is capable of forming a stable, water-soluble hydrochloride, which comprises converting part of the amine into its hydrochloride whereby to hydrotropically solubilize the remainder of the amine, incorporating into the mass sufficient water to form a suspension of the free amine in a solution of the hydrochloride, and then filtering off the solid impurities.

9. The process of separating an aromatic amine, which is adapted to form a stable, water-soluble hydrochloride, from an aqueous sludge containing the same in admixture with solid, water-insoluble impurities, which comprises adding to the sludge a sufficient quantity of water and hydrochloric acid to convert part of the amine into a water-soluble hydrochloride thereby hydrotropically solubilizing additional quantities of the free amine, and then filtering the aqueous solution thus produced from its solid impurities.

10. A process as in claim 9 followed by the step of separating the aromatic amine from the aqueous solution by completely acidifying the mass and precipitating the aromatic amine in the form of a sulfate.

LEE CONE HOLT.
LEE LINSLEY ALEXANDER.